(12) United States Patent
Ryu

(10) Patent No.: US 9,337,515 B2
(45) Date of Patent: May 10, 2016

(54) RECHARGEABLE BATTERY

(71) Applicant: SAMSUNG SDI CO., LTD., Yongin-si, Gyeonggi-do (KR)

(72) Inventor: Myoung-Han Ryu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 247 days.

(21) Appl. No.: 14/024,586

(22) Filed: Sep. 11, 2013

(65) Prior Publication Data
US 2014/0199571 A1 Jul. 17, 2014

(30) Foreign Application Priority Data

Jan. 17, 2013 (KR) ........................ 10-2013-0005425

(51) Int. Cl.
| | |
|---|---|
| *H01M 2/00* | (2006.01) |
| *H01M 10/0587* | (2010.01) |
| *H01M 2/02* | (2006.01) |
| *H01M 10/04* | (2006.01) |
| *H01M 10/052* | (2010.01) |

(52) U.S. Cl.
CPC .......... *H01M 10/0587* (2013.01); *H01M 2/022* (2013.01); *H01M 10/0431* (2013.01); *H01M 10/052* (2013.01); *Y02T 10/7011* (2013.01)

(58) Field of Classification Search
CPC ..................................................... H01M 2/14
See application file for complete search history.

(56) References Cited

U.S. PATENT DOCUMENTS

| | | |
|---|---|---|
| 7,955,730 B2 | 6/2011 | Kim et al. |
| 2006/0275659 A1 | 12/2006 | Kim et al. |
| 2009/0061304 A1 | 3/2009 | Muraoka et al. |

FOREIGN PATENT DOCUMENTS

| | | | |
|---|---|---|---|
| JP | 2007-188855 | * | 7/2007 |
| JP | 4494366 B2 | | 6/2010 |

* cited by examiner

*Primary Examiner* — Jacob Marks
(74) *Attorney, Agent, or Firm* — Lewis Roca Rothgerber Christie LLP

(57) ABSTRACT

A rechargeable battery includes: an electrode assembly formed by winding a positive and negative electrode plate and a separator between the electrode plates, and including a cavity along an axial direction of the electrode assembly; a center pin along the axial direction and housed in the cavity; a can having an opening; and a cap assembly configured to close the opening, wherein the center pin includes: a center portion along a radial direction of the center pin; a first perimeter portion coupled to a first end portion of the center portion and extending from the first end portion toward a second end portion of the center portion; and a second perimeter portion coupled to the first end portion of the center portion and extending from the first end portion toward the second end portion in a circumferential direction opposite to a circumferential direction of the first perimeter portion.

20 Claims, 10 Drawing Sheets

RECHARGEABLE BATTERY

CROSS-REFERENCE TO RELATED APPLICATION

This application claims priority to and the benefit of Korean Patent Application No. 10-2013-0005425, filed on Jan. 17, 2013, in the Korean Intellectual Property Office, the disclosure of which is incorporated herein in its entirety by reference.

BACKGROUND

1. Field

One or more embodiments of the present invention relate to a rechargeable battery.

2. Description of the Related Art

Secondary batteries which may be repeatedly recharged are widely used because of their compact design and high capacity.

A low-capacity battery in which one battery cell is packaged is widely used in portable compact electronic devices such as mobile phones, plasma display panels (PDP), or cameras. A high-capacity battery in which a plurality of battery cells is connected is used in hybrid vehicles, electromotive tools, and the like. Examples of a secondary battery include a nickel-cadmium battery, a lead-acid battery, a nickel-metal hydride battery, and a lithium rechargeable battery. A lithium rechargeable battery may be classified into a cylindrical lithium rechargeable battery, an angular lithium rechargeable battery, and a pouch lithium rechargeable battery depending on a shape of an exterior material that receives an electrode assembly. A cylindrical rechargeable battery may be formed by providing an electrolytic solution with an electrode assembly in which a positive electrode plate, a negative electrode plate, and a separator are cylindrically wound. However, the cylindrical rechargeable battery may have a problem in that when the electrode assembly is cylindrically wound, a space is formed in the center of the electrode assembly, thereby unwinding or deforming the electrode assembly.

In order to solve this problem, a method of inserting a center pin into the space formed in the center of the electrode assembly has been introduced.

SUMMARY

Additional aspects will be set forth in part in the description which follows and, in part, will be apparent from the description, or may be learned by practice of the presented embodiments.

According to one or more embodiments of the present invention, a rechargeable battery includes: an electrode assembly formed by winding a positive electrode plate, a negative electrode plate, and a separator between the positive electrode plate and the negative electrode plate, and including a cavity extending along an axial direction of the electrode assembly; a center pin extending along the axial direction and housed in the cavity; a can having an opening in which the electrode assembly and the center pin are received; and a cap assembly configured to close the opening, wherein the center pin includes: a center portion extending along a radial direction of the center pin; a first perimeter portion coupled to a first end portion of the center portion and extending in a first circumferential direction from the first end portion toward a second end portion of the center portion that is opposite to the first end portion; and a second perimeter portion coupled to the first end portion of the center portion and extending from the first end portion toward the second end portion in a second circumferential direction that is opposite to the first circumferential direction of the first perimeter portion.

An end portion of the first perimeter portion and an end portion of the second perimeter portion may be spaced from each other to form a slit adjacent to the second end portion of the center portion.

The slit may extend along the axial direction.

An end portion of the first perimeter portion, an end portion of the second perimeter portion, and the second end portion of the center portion may be spaced from one another and adjacent to one another.

The axial direction and the radial direction may be orthogonal to each other.

The center portion may linearly extend to pass through a center of the cavity.

A top surface and a bottom surface of the center pin may be open.

A length of the center portion in the radial direction may be less than a diameter of an outer circumferential surface of the center pin.

The length of the center portion in the radial direction may be greater than ½ of the diameter of the outer circumferential surface of the center pin.

When the diameter of the outer circumferential surface of the center pin is $r_{co}$ and a diameter of an inner circumferential surface of the center pin is $r_{ci}$, the length $l_1$ of the center portion in the radial direction may satisfy $$\frac{(r_{co} + r_{ci})}{2} < l_1.$$

A thickness of the center portion may be greater than a thickness of each of the first perimeter portion and the second perimeter portion.

An end portion of the first perimeter portion may extend in a first circumferential direction of the center pin from the first end portion of the center portion, and an end portion of the second perimeter portion may extend in a second circumferential direction of the center pin, which is opposite to the first circumferential direction of the center pin, from the first end portion of the center portion.

The end portion of the first perimeter portion may be bent more inward than the end portion of the second perimeter portion.

An outer circumferential surface of the center pin may contact an inner surface of the electrode assembly.

The center pin may include a conductive material.

According to one or more embodiments of the present invention, a rechargeable battery includes: an electrode assembly formed by winding a positive electrode plate, a negative electrode plate, and a separator between the positive electrode plate and the negative electrode plate, and including a cavity extending along an axial direction of the electrode assembly; a center pin extending along the axial direction and housed in the cavity; a can having an opening in which the electrode assembly and the center pin are received; and a cap assembly configured to close the opening, wherein the center pin includes: a center portion extending along a radial direction of the center pin through a center of the center pin; a first perimeter portion coupled to a first end portion of the center portion and extending in a first circumferential direction of the center pin from the first end portion toward a second end portion of the center pin that is opposite to the first end portion; and a second perimeter portion coupled to the first end portion of the center portion and extending from the first end portion toward the second end portion in a second circumferential direction that is opposite to the first circumferential direction of the center pin, wherein the second end portion of the center portion, an end portion of the first perimeter portion adjacent to the second end portion, and an end portion of the second perimeter portion adjacent to the second end portion are adjacent to one another.

The second end portion of the center portion, the end portion of the first perimeter portion, and the end portion of the second perimeter portion may be spaced from one another.

The center pin may have a slit extending along the axial direction, wherein the second end portion of the center portion, the end portion of the first perimeter portion, and the end portion of the second perimeter portion are adjacent to the slit such that at least one of the second end portion of the center portion, the end portion of the first perimeter portion, and the end portion of the second perimeter portion is configured to extend beyond the slit and penetrate the electrode assembly due to an external impact.

A length of the center portion in the radial direction may be less than a diameter of an outer circumferential surface of the center pin.

A length $l_1$ of the center portion in the radial direction may satisfy $$\frac{(r_{co} + r_{ci})}{2} < l_1 < r_{co}$$

where $r_{co}$ is a diameter of an outer circumferential surface of the center pin and $r_{ci}$ is a diameter of an inner circumferential surface of the center pin.

BRIEF DESCRIPTION OF THE DRAWINGS

These and/or other aspects of the present invention will become apparent and more readily appreciated from the following description of the embodiments taken in conjunction with the accompanying drawings, in which.

DETAILED DESCRIPTION

Figure 1:
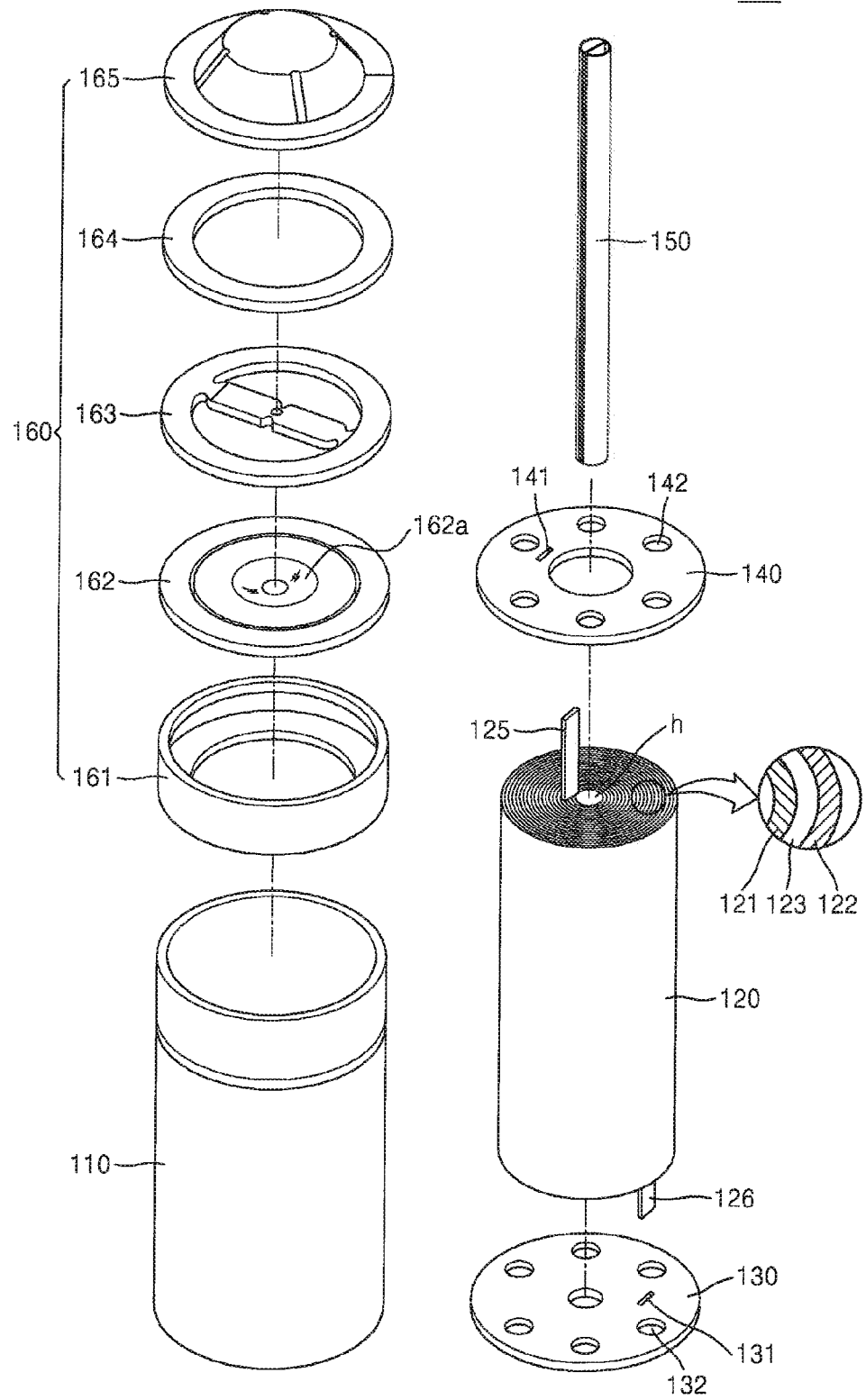
FIG. 1 is an exploded perspective view illustrating a rechargeable battery according to an embodiment of the present invention.

As used herein, the term "and/or" includes any and all combinations of one or more of the associated listed items. Expressions such as "at least one of," when preceding a list of elements, modify the entire list of elements and do not modify the individual elements of the list.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention. The terms "first," "second," and the like, "primary," "secondary," and the like, as used herein, do not denote any order, quantity, or importance, but rather are used to distinguish one element, region, component, layer, or section from another. The terminology used herein is for the purpose of describing particular embodiments only and is not intended to be limiting of exemplary embodiments of the present invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, components, and/or groups but do not preclude the presence or addition of one or more other features, integers, steps, operations, elements, components, and/or groups thereof. "/" used herein may be construed as "and" or "or" according to the context.

In the drawings, thicknesses of elements are exaggerated for clarity, and the same elements are denoted by the same reference numerals.

Figure 2:
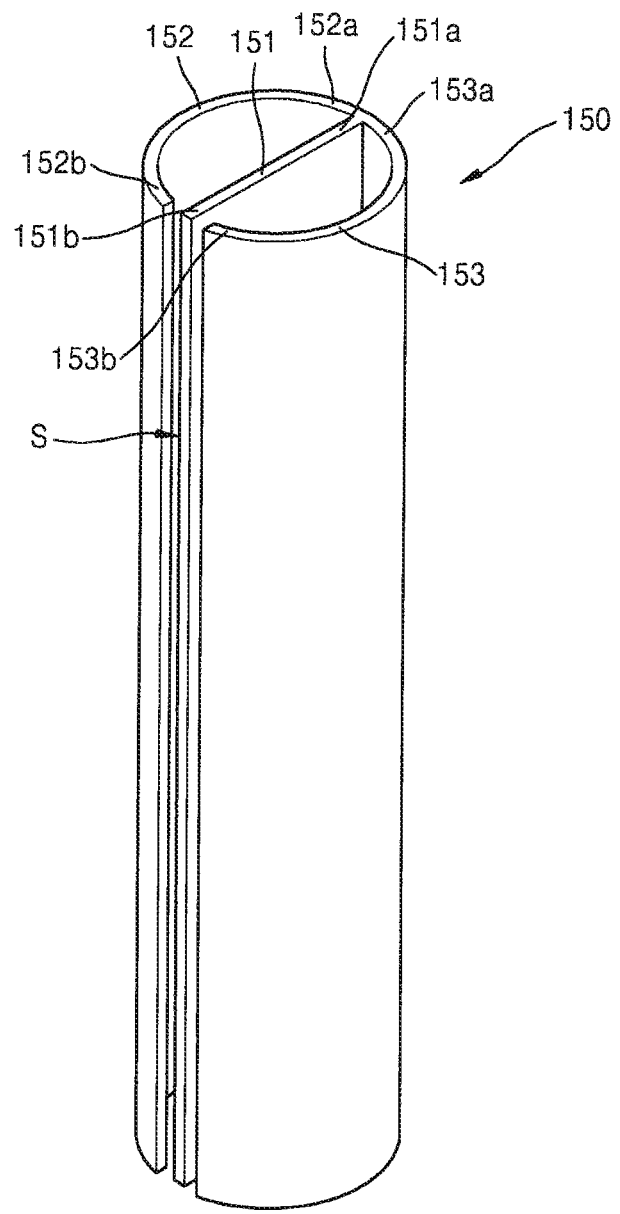
FIG. 2 is a perspective view illustrating a center pin shown in FIG. 1 according to an embodiment of the present invention.

FIG. 1 is an exploded perspective view illustrating a rechargeable battery according to an embodiment of the present invention. FIG. 2 is a perspective view illustrating the center pin 150 shown in FIG. 1 according to an embodiment of the present invention.

Referring to FIG. 1, the rechargeable battery may include a can 110, an electrode assembly 120, a lower insulating plate 130, an upper insulating plate 140, a center pin 150, and a cap assembly 160.

The can 110 may have a cylindrical shape, and may be formed of, but is not limited to, steel, stainless steel, aluminum, or an alloy thereof. An opening may be formed in an upper portion of the can 110, and the electrode assembly 120 may be inserted through the opening and into the can 110.

Although the can 110 has a cylindrical shape in FIG. 1, the embodiments of the present invention are is not limited thereto, and the can 110 may have any of various suitable shapes. For example, assuming that the rechargeable battery is a lithium rechargeable battery, as long as the can 110 has a structure into which the center pin 150 may be inserted, the can 110 may have an oval cross-sectional shape or any of other cross-sectional shapes.

The electrode assembly 120 includes a first electrode plate 121, a second electrode plate 122, and a separator 123 disposed (or located) between the first electrode plate 121 and the second electrode plate 122. The first electrode plate 121 and the second electrode plate 122 have different polarities, and the separator 123 is disposed (or located) between the first electrode plate 121 and the second electrode plate 122 to reduce a possibility of (or prevent) a shortcircuit between the first and second electrode plates 121 and 122. The electrode assembly 120 may be manufactured by sequentially stacking the first electrode plate 121, the separator 123, and the second electrode plate 122, and winding the first electrode plate 121, the separator 123, and the second electrode plate 122 in a jelly roll shape about an axis (e.g., a predetermined axis). The electrode assembly 120 is formed to have a substantially cylindrical jelly roll shape, and a center of the jelly roll shape is hollow to form a cavity 'h'.

The first electrode plate 121 may be a negative electrode plate, and the negative electrode plate may be manufactured by coating a negative electrode active material including graphite on an electrode current collector such as copper (Cu). The second electrode plate 122 may be a positive electrode plate, and the positive electrode plate may be manufactured by coating a positive electrode active material including lithium (Li) on an electrode current collector such as aluminum (Al).

Each of the electrode current collectors of the first electrode plate 121 and the second electrode plate 122 may include an uncoated portion on which an active material is not coated. In one embodiment, a first electrode tab 125 and a second electrode tab 126 are respectively attached (or coupled) to the uncoated portions of the first electrode plate 121 and the second electrode plate 122. The first electrode tab 125 is attached to the first electrode plate 121, and the second electrode tab 126 is attached (or coupled) to the second electrode plate 122. The first electrode tab 125 may extend upward toward the opening of the can 110, and the second electrode tab 126 may extend downward toward the bottom of the can 110. Alternatively, according to another embodiment, the first electrode tab 125 and the second electrode tab 126 extend in the same direction.

The lower insulating plate 130 is disposed (or located) on a lower end of the electrode assembly 120 inserted into the can 110, the upper insulating plate 140 is disposed (or located) on an upper end of the electrode assembly 120, and the center pin 150 is inserted into the cavity 'h' formed in the center of the electrode assembly 120. Before the electrode assembly 120 is inserted into the can 110, the second electrode tab 126 extending downward from the electrode assembly 120 may be bent to be parallel to an inner bottom surface of a lower portion of the can 110.

The lower insulating plate 130 may be disposed (or located) between the inner bottom surface of the can 110 and the electrode assembly 120. The lower insulating plate 130 may include a first hole 131 through which the second electrode tab 126 may pass, and the second electrode tab 126 passing through the first hole 131 may contact the inner bottom surface of the can 110 when being bent to be parallel to the inner bottom surface of the can 110 as described above. A plurality of second holes 132 may be formed at the lower insulating plate 130. Here, because of these holes 132, a decrease in the amount of an electrolytic solution that may be provided due to a reduced space because of the lower insulating plate 130 may be reduced (or minimized).

The upper insulating plate 140 may include a plurality of third holes 142 through which an electrolytic solution may be easily impregnated into the electrode assembly 120. The upper insulating plate 140 may include a fourth hole 141 through which the first electrode tab 125 which extends upward is drawn out to the outside.

The center pin 150 elongates (or extends) along an axial direction of the electrode assembly 120, and is inserted into the cavity 'h' formed in the center of the electrode assembly 120. The center pin 150 may help a safety vent 162 to normally operate by providing a passage through which a gas emitted from the electrode assembly 120 flows, and may reduce the possibility of the rechargeable battery exploding (or may prevent the rechargeable battery from exploding) by inducing an internal short when an external impact or an external force strong enough to deform the center pin 150 is applied to the rechargeable battery. To this end, the center pin 150 may include a conductive material such as a metal.

Referring to FIG. 2, the center pin 150 elongates (or extends) in a substantially cylindrical shape. At least one of an upper portion and a lower portion of the center pin 150 is open, and a slit 'S' elongates (or extends) along the axial direction at a side surface of the center pin 150.

An open top surface of the center pin 150, an open bottom surface of the center pin 150, and the slit 'S' may provide a passage through which a gas emitted from the electrode assembly 120 flows. In particular, the slit 'S' may form a passage through which a gas generated in the electrode assembly 120 is discharged to the outside, for example, when the lower insulating plate 130 and/or the upper insulating plate 140 melt due to an abnormally high temperature of the rechargeable battery, thus causing the open top and/or bottom surfaces of the respective upper and/or lower portions of the center pin 150 to become closed.

The center pin 150 includes a center portion 151 that extends along a radial direction, and includes a first perimeter portion 152 and a second perimeter portion 153 which are formed at both sides about a first end portion 151a of the center portion 151. The first perimeter portion 152 and the second perimeter portion 153 extend in opposite circumferential directions from the first end portion 151a of the center portion 151 toward a second end portion 151b of the center portion 151.

A first end portion 152a of the first perimeter portion 152 and a first end portion 153a of the second perimeter portion 153 are coupled to the first end portion 151a of the center portion 151. For example, the first and second perimeter portions 152 and 153 and the center portion 151 may be integrally manufactured to integrally couple the first end portions 152a and 153a of the first and second perimeter portions 152 and 153 to the first end portion 151a of the center portion 151. By contrast, a second end portion 152b of the first perimeter portion 152, a second end portion 153b of the second perimeter portion 153, and the second end portion 151b of the center portion 151 are disposed (or located) adjacent to one another but are not coupled to one another. The second end portion 152b of the first perimeter portion 152 and the second end portion 153b of the second perimeter portion 153 are spaced apart from each other to form the slit 'S'. The second end portion 151b of the center portion 151, the second end portion 152b of the first perimeter portion 152, and the second end portion 153b of the second perimeter portion 153 are spaced apart from each other to be disposed (or located) adjacent to the slit 'S'.

Referring back to FIG. 1, the cap assembly 160 may include the safety vent 162, a current blocking member 163, a positive temperature element 164, an upper cap 165, and a gasket 161. The cap assembly 160 may close the opening of the can 110.

The safety vent 162 may be formed of a metal, and may be electrically coupled to the second electrode plate 122 by being coupled to the second electrode tab 126 attached (or coupled) to the second electrode plate 122. The safety vent 162 may have a central protrusion 162a that protrudes downward toward the bottom of the can 110. When a pressure increases in the rechargeable battery, the protrusion 162a may be deformed or broken by protruding upward toward the top of the can 110.

The current blocking member 163 may be disposed (or located) over the safety vent 162, and may be electrically and mechanically coupled to the safety vent 162. The current blocking member 163 may be damaged when the safety vent 162 becomes deformed or broken.

The positive temperature element 164 may be disposed (or coupled) over the current blocking member 163, and may be electrically and mechanically coupled to the current blocking member 163. The positive temperature element 164 may reduce (or prevent) current when an overcurrent occurs.

The upper cap 165 may be disposed (or located) over the positive temperature element 164, and may be electrically and mechanically coupled to the current blocking member 163. The upper cap 165 may function as a terminal that applies current to an electronic device disposed (or located) outside the rechargeable battery.

The gasket 161 may fixedly (or tightly) surround the safety vent 162, the current blocking member 163, the positive temperature element 164, and the upper cap 165. The gasket 161 may also insulate the can 110 that functions as a negative electrode of the rechargeable battery from the upper cap 165 that may function as a positive electrode of the rechargeable battery. To this end, the gasket 161 may include an insulating material.

An example where the center pin 150 induces an internal short when an external force or an external impact is applied to the rechargeable battery will be explained with reference to FIGS. 3A through 3C.

Figure 3A:
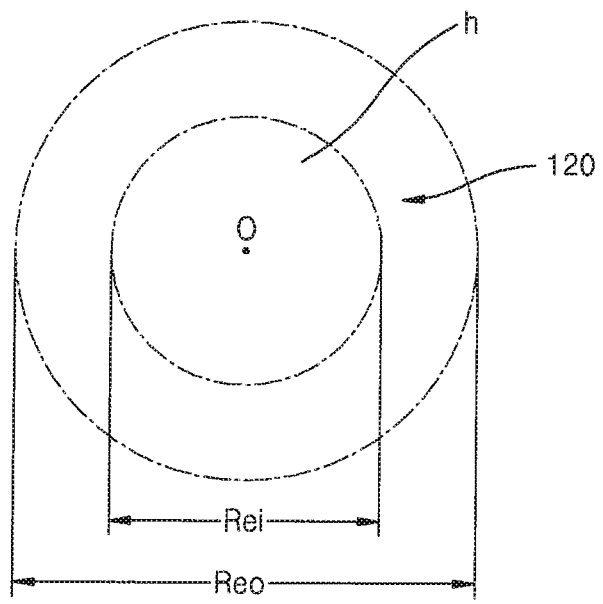
FIG. 3A is a top plan view illustrating an electrode assembly shown in FIG. 1.

FIG. 3A is a top plan view illustrating the electrode assembly 120 shown in FIG. 1. FIG. 3B is a top plan view illustrating the center pin 150 shown in FIG. 1. FIG. 3C is a top plan view illustrating a state where the center pin 150 is inserted into the cavity 'h' formed in the center of the electrode assembly 120 shown in FIG. 1.

Referring to FIG. 3A, the electrode assembly 120 is formed to have a cylindrical jelly roll shape by stacking the first electrode plate 121, the separator 123, and the second electrode plate 122 and then winding the first electrode plate 121, the separator 123, and the second electrode plate 122 as described with reference to FIG. 1. The cavity 'h' is formed in the center of the electrode assembly 120. Accordingly, the electrode assembly 120 may have an annular cross-sectional shape having a thickness (e.g., a predetermined thickness). A thickness of the electrode assembly 120 may be ½ of a difference between a diameter Reo of an outer circumferential surface of the electrode assembly 120 and a diameter Rei of an inner circumferential surface of the electrode assembly 120.

Figure 3B:
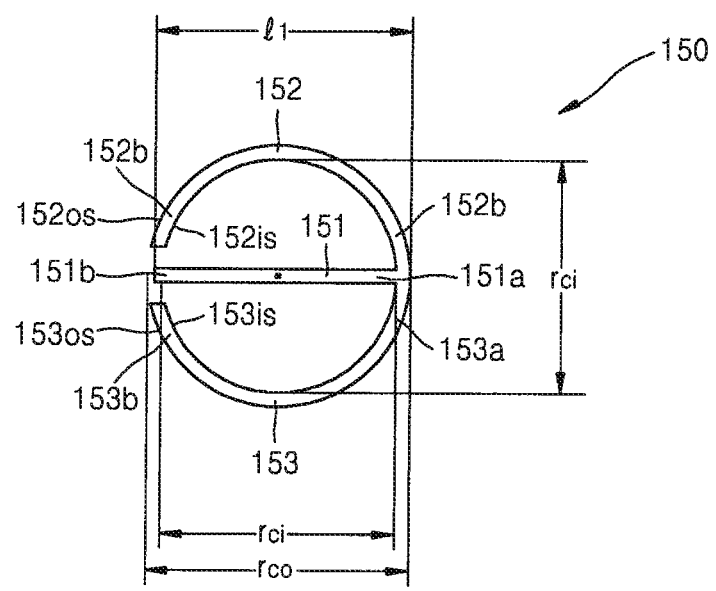
FIG. 3B is a top plan view illustrating the center pin shown in FIG. 1.

Referring to FIG. 3B, the center pin 150 has a substantially cylindrical shape, and the first perimeter portion 152 and the second perimeter portion 153, which extend in opposite circumferential directions, are spaced apart from each other to form the slit 'S'. The first perimeter portion 152 and the second perimeter portion 153 may be bent in the opposite circumferential directions to have curvatures (e.g., predetermined curvatures). Curvatures of the first and second perimeter portions 152 and 153 may be the same.

The center pin 150 includes the center portion 151 that extends in the radial direction. For example, the center portion 151 may straightly (or linearly) extend in a diameter direction through a center of the center pin 150 and/or center of the cavity 'h'. The center portion 151 straightly (or linearly) extends toward the slit 'S' between the first and second perimeter portions 152 and 153.

The second end portion 151b of the center portion 151 is disposed (or located) adjacent to the slit 'S', but does not protrude to the outside beyond the slit 'S'. For example, in order for the center portion 151 not to protrude to the outside beyond the slit 'S', a length l1 of the center portion 151 may be less than a diameter $r_{co}$ of an outer circumferential surface of the center pin 151 as shown in Condition 1 below. While $r_{co}$ is the diameter of the outer circumferential surface of the center pin 150 in Condition 1, $r_{co}$ is also an outer diameter of the first perimeter portion 152 and an outer diameter of the second perimeter portion 153.

$$l_1 < r_{co} \qquad (1).$$

When the length $l_1$ of the center portion 151 is equal to or greater than the diameter $r_{co}$ of the outer circumferential surface, the center portion 151 protrudes beyond the slit 'S', and thus the center portion 151 may damage an inner circumferential surface of the electrode assembly 120 when the center pin 150 is inserted into the cavity 'h' of the electrode assembly 120.

The length $l_1$ of the center portion 151 may be at least greater than ½ of the diameter $r_{co}$ of the outer circumferential surface of the center pin 150 as shown in Condition 2 below.

$$\frac{r_{co}}{2} < l_1 \qquad (2)$$

In one example, when the length $l_1$ of the center portion 151 is less than ½ of the diameter $r_{co}$ of the outer circumferential surface, and although an external force or an external impact strong enough to deform the center pin 150 is applied to the rechargeable battery, it is difficult for the center portion 151 of the center pin 150 to protrude through (or puncture) the electrode assembly 120 beyond the slit 'S' and to thereby induce an internal short. Accordingly, in one example, when the length $l_1$ of the center portion 151 is less than ½ of the diameter $r_{co}$ of the outer circumferential surface, it is difficult to reduce a possibility of the rechargeable battery exploding (or prevent the rechargeable battery from exploding) due to an external impact/external force.

As such, in one embodiment, when an external force is applied to the rechargeable battery, because the center pin 150 may induce an internal short in order to reduce a possibility of the rechargeable battery exploding (or prevent the rechargeable battery from exploding), the length $l_1$ of the center portion 151 should be long enough for the center portion 151 to pass through the electrode assembly 120 in consideration of an intensity of the external force. Considering a strength of the can 110 and an explosion of the rechargeable battery due to an external force, the length l1 of the center portion 151 may be determined such that the second end portion 151b of the center portion 151 is disposed (or located) at a more inner position than those of outer surfaces 152os and 153os of the first and second perimeter portions 152 and 153, respectively, and is disposed (or located) at a more outer position than those of inner surfaces 152is and 153is of the first and second perimeter portions 152 and 153, respectively, as shown in Condition 3.

$$r_{ci} + \frac{(r_{co} - r_{ci})}{2} < l_1 \quad (3)$$

$$\frac{(r_{co} + r_{ci})}{2} < l_1.$$

Figure 3C:
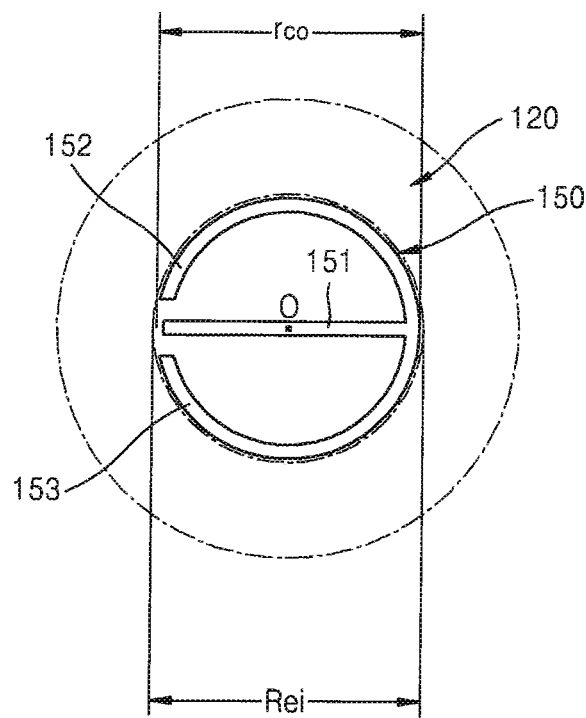
FIG. 3C is a top plan view illustrating a state where the center pin is inserted into the cavity formed in the center of the electrode assembly shown in FIG. 1.

Referring to FIG. 3C, the center pin 150 is inserted into the cavity 'h' of the electrode assembly 120. In this case, in order to reduce a possibility that the inner circumferential surface of the electrode assembly 120 becomes unwound (or to prevent the inner circumferential surface of the electrode assembly 120 from being unwound), the diameter $r_{co}$ of the outer circumferential surface of the center pin 150 may be substantially the same as a diameter Rei of the cavity 'h', which is also the diameter of the inner circumferential surface of the electrode assembly 120.

FIGS. 4A-4B and FIGS. 5A-5B are top plan views illustrating examples where the center pin 150 inserted into the cavity 'h' of the electrode assembly 120 shown in FIG. 3C induces an internal short due to external forces F1 and F2, respectively.

Figure 4A:
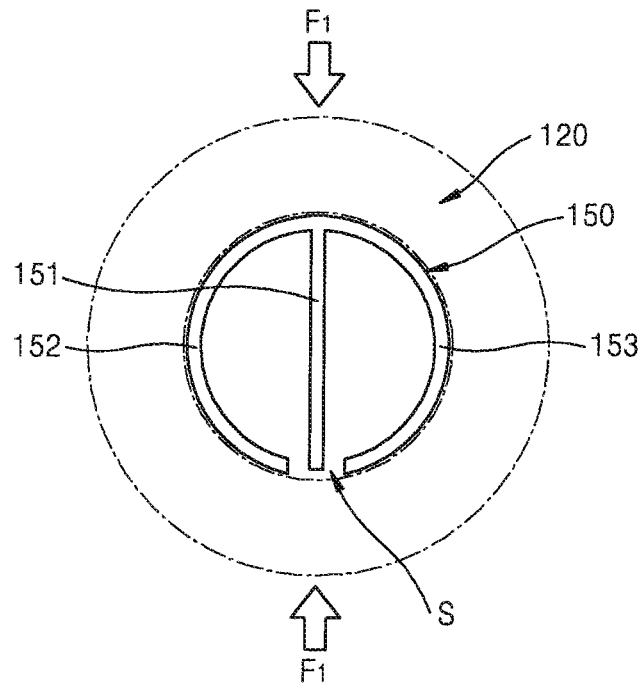
FIGS. 4A and 4B are top plan views illustrating an example where the center pin inserted into the cavity of the electrode assembly shown in FIG. 3C induces an internal short due to an external force.
Figure 4B:
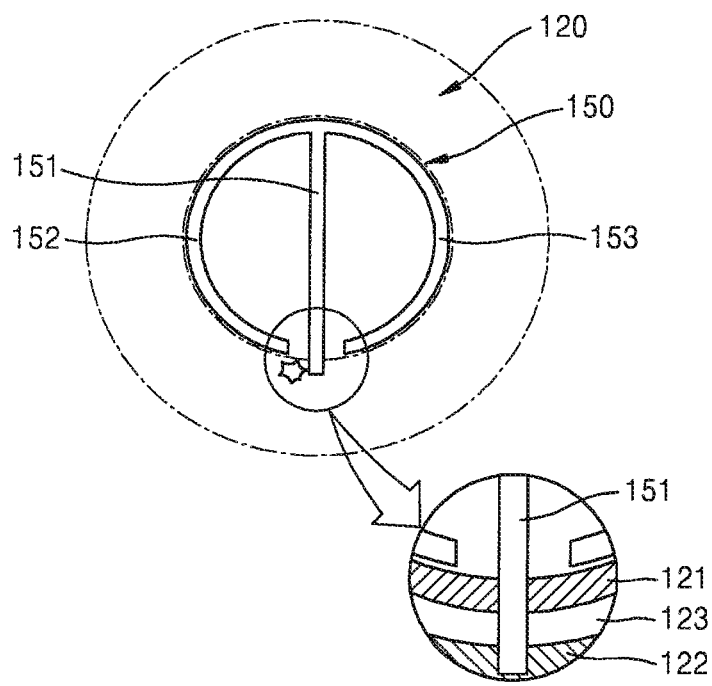

Referring to FIGS. 4A and 4B, when an external force $F_1$ is applied in a direction in which the center portion 151 extends, the can 110 of the rechargeable battery, and the electrode assembly 120 and the center pin 150, which are received in the can 110, may become deformed due to the external force $F_1$.

The center pin 150, deformed due to the external force $F_1$, may induce an internal short as shown in FIG. 4B. For example, the center portion 151 of the center pin 150 protrudes beyond the slit 'S' of the center pin 150 and passes through (or punctures) a portion of the electrode assembly 120 formed around the slit 'S'. Once the center portion 151 passes through the electrode assembly 120 in the radial direction, the first electrode plate 121 and the second electrode plate 122, which are insulated from each other by the separator 123, conduct current therethrough due to the penetration of the center portion 151, thereby inducing a short. Generally, when the external force $F_1$ (or an external impact) strong enough to deform the center pin 150 is applied to the rechargeable battery, the rechargeable battery may become abnormally heated due to the deformation of the center pin 150. However, because the center pin 150 of embodiments of the present invention induces an internal short of the electrode assembly 120 before the rechargeable battery becomes abnormally heated, the possibility that the rechargeable battery may explode is reduced (or the rechargeable battery may be prevented from exploding) due to the abnormal heating.

Figure 5A:
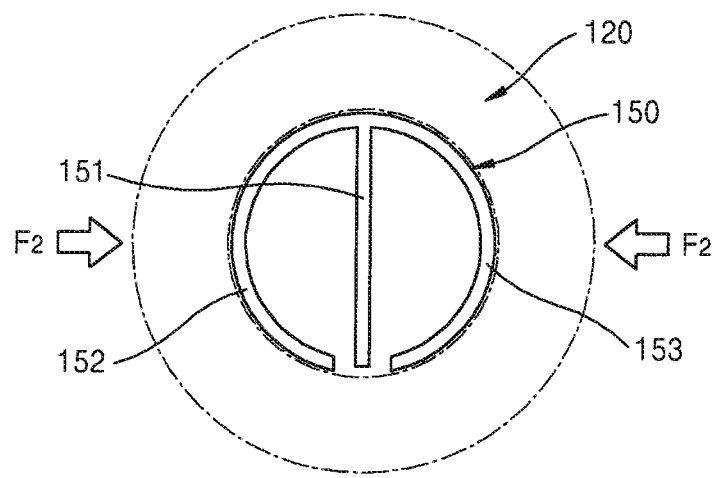
FIGS. 5A and 5B are top plan views illustrating an example where the center pin inserted into the cavity of the electrode assembly shown in FIG. 3C induces an internal short due to another external force.
Figure 5B:
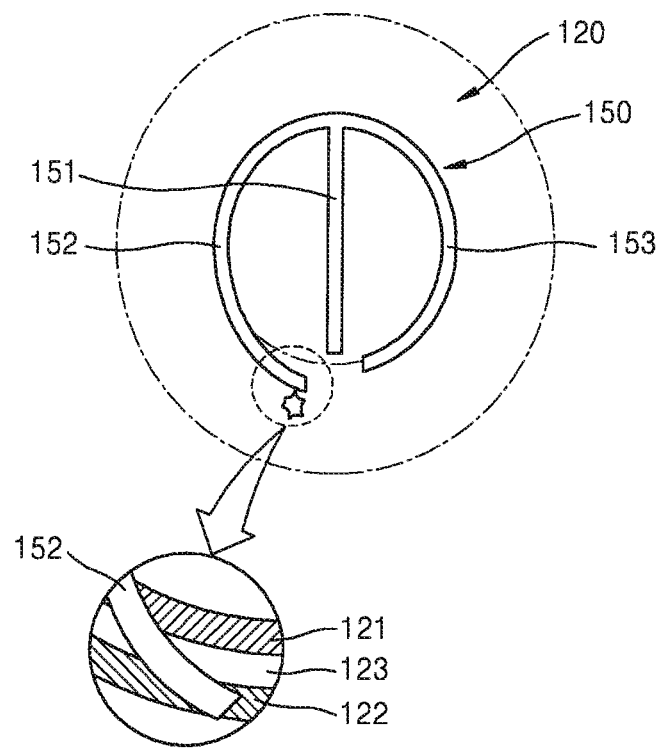

Referring to FIGS. 5A and 5B, even when an external force $F_2$ is applied in a direction perpendicular to the center portion 151, the center pin 150 may reduce the possibility of the rechargeable battery exploding (or may prevent the rechargeable battery from exploding) due to abnormal heating by inducing an internal short of the electrode assembly 120.

For example, when the center pin 150 becomes deformed due to the external force $F_2$ as shown in FIG. 5A, at least one of the first perimeter portion 152 and the second perimeter portion 153 of the center pin 150 may protrude (or puncture) to pass through an area of the electrode assembly 120 formed around the slit 'S'. Once at least one of the first perimeter portion 152 and the second perimeter portion 153 passes through (or punctures) the electrode assembly 120, the first electrode plate 121 and the second electrode plate 122, which are insulated from each other by the separator 123, conduct current therethrough due to the first and second perimeter portions 152 and 153, thereby inducing a short.

When the external force $F_2$ (or an external impact) strong enough to deform the center pin 150 is applied to the rechargeable battery, the rechargeable battery may become abnormally heated due to the deformation of the center pin 150. However, because the center pin 150 induces an internal short of the electrode assembly 120 before the rechargeable battery becomes abnormally heated, the possibility that the rechargeable battery explodes may be reduced (or the rechargeable battery may be prevented from exploding) due to the abnormal heating.

Although the center portion 151 of the center pin 150 induces an internal short in FIGS. 4A and 4B and at least one of the first and second perimeter portions 152 and 153 of the center pin 150 induces an internal short in FIGS. 5A and 5B, the present invention is not limited thereto. The center pin 150 may become deformed in various ways according to an intensity and a direction of the external force $F_2$ applied to the rechargeable battery. As the center pin 150 becomes deformed, at least one of the first perimeter portion 152, the second perimeter portion 153, and the center portion 151 of the center pin 150 may induce an internal short of the electrode assembly 120 by passing through (or puncturing) the electrode assembly 120.

Figure 6:
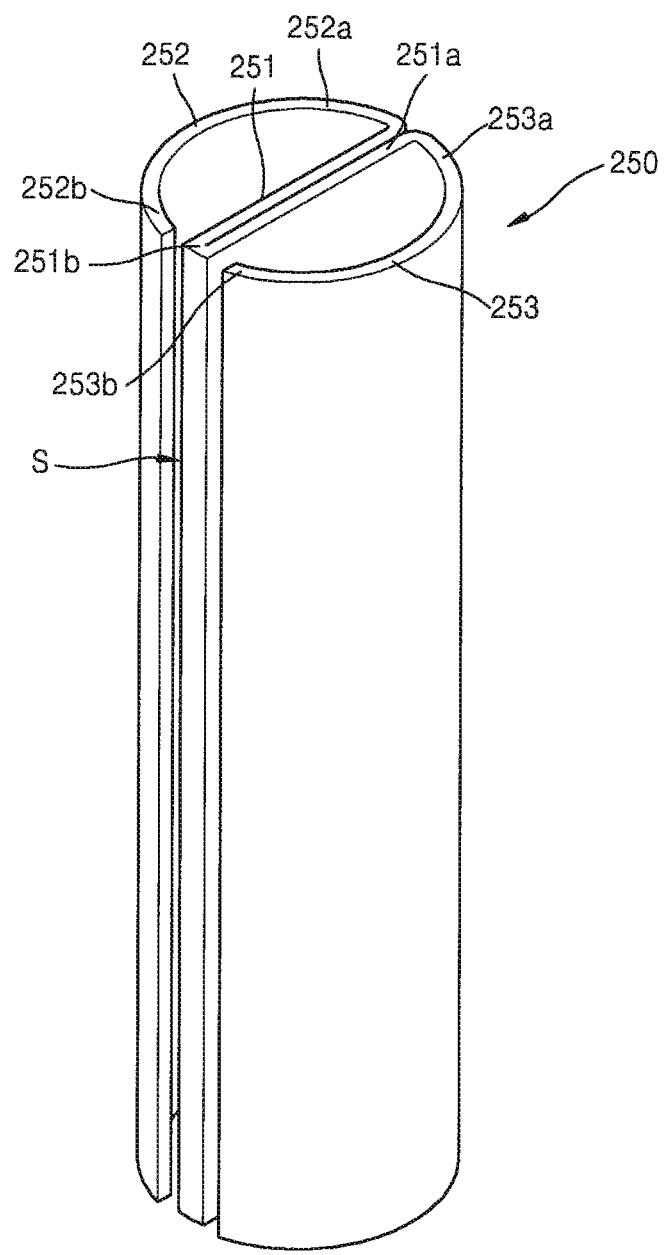
FIG. 6 is a perspective view illustrating a center pin according to another embodiment of the present invention.
Figure 7:
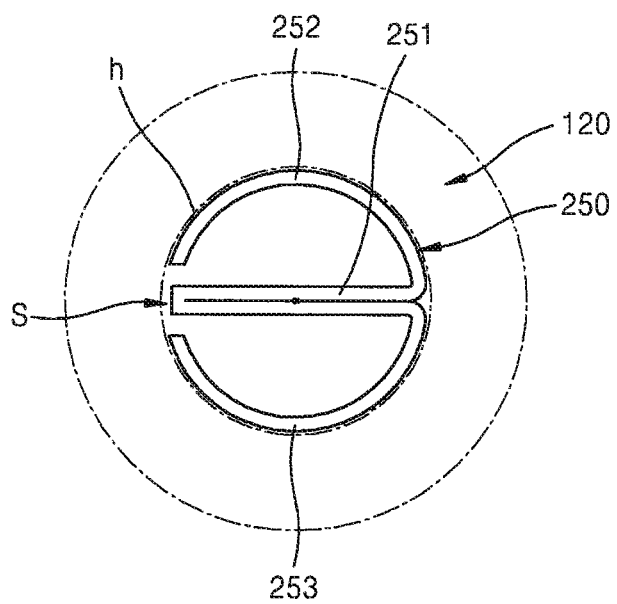
FIG. 7 is a top plan view illustrating the center pin shown in FIG. 6.

FIG. 6 is a perspective view illustrating a center pin 250 according to another embodiment of the present invention. FIG. 7 is a top plan view illustrating the center pin 250 shown in FIG. 6.

Referring to FIG. 6, the center pin 250 has a substantially cylindrical shape, and has the slit 'S' that extends along the axial direction. An end portion 251b of a center portion 251, an end portion 252b of a first perimeter portion 252, and an end portion 253b of a second perimeter portion 253, which extend around the slit 'S' and toward the slit 'S', are disposed (or located) adjacent to one another. Referring to FIG. 7, the center pin 250 includes the center portion 251, which extends in the radial direction, and the first perimeter portion 252 and the second perimeter portion 253, which are formed on both sides about a first end portion 251a of the center portion 251.

An overall shape of the center pin 250, and conditions of the center portion 251 and the first and second perimeter portions 152 and 153 for reducing a possibility of the electrode assembly 120 being damaged (or preventing the electrode assembly 120 from being damaged) when the center pin 250 is inserted into the cavity 'h' and for inducing an internal short due to an external force are the same as those described above with reference to Conditions 1 through 3.

In one embodiment, while the center pin 150 of FIGS. 2 and 3A through 3C is manufactured by using a casting method that includes heating and melting a metal, which is a raw material, and pouring the metal into a mold to have a shape (e.g., a predetermined shape), but the present invention is not thereby limited. For example, in one embodiment, the center pin 250 of FIGS. 6 and 7 may be manufactured by bending, folding, and welding one metal plate.

The center pin 250 may be manufactured by bending a first portion of a quadrangular metal plate to form the first perimeter portion 252, folding and welding a second portion of the metal plate coupled to the first perimeter portion 252 to form the center portion 251, and bending a third portion of the metal plate coupled to the center portion 251 to form the second perimeter portion 253. Accordingly, the center portion 251 of the center pin 250 may be formed by folding the second portion of the metal plate into two layers, and may have a thickness which is about 2 times greater than a thickness of each of the first and second perimeter portions 252 and 253. The two layers of the metal plate may be integrated by being welded to pass through an inner surface of the electrode assembly 120, thereby completely forming the center portion 251 of the center pin 250.

Figure 8:
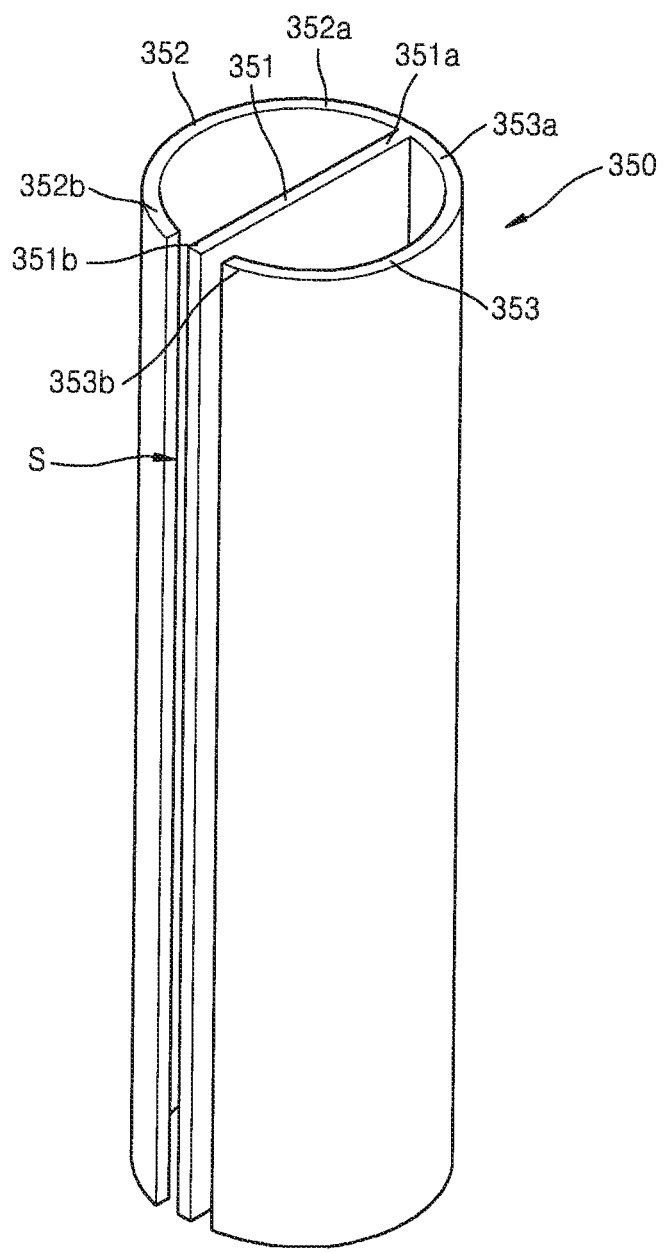
FIG. 8 is a perspective view illustrating a center pin according to another embodiment of the present invention.
Figure 9:
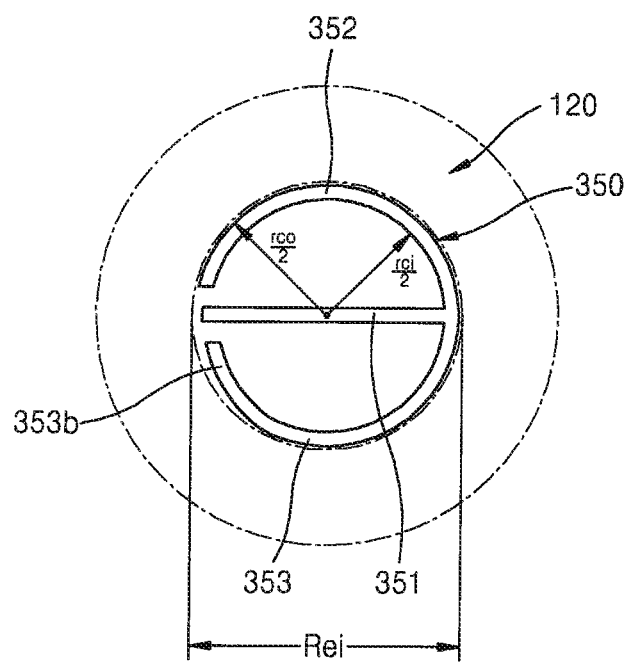
FIG. 9 is a top plan view illustrating the center pin shown in FIG. 8.

FIG. 8 is a perspective view illustrating a center pin 350 according to another embodiment of the present invention. FIG. 9 is a top plan view illustrating the center pin 350 shown in FIG. 8.

Referring to FIGS. 8 and 9, the center pin 350 has a substantially cylindrical shape, and includes a center portion 351 and first and second perimeter portions 352 and 353 which extend in opposite circumferential directions from a first end portion 351*a* of the center portion 351.

The center portion 351 extends along the radial direction to cross through a center of the center pin 350. A first end portion 352*a* of the first perimeter portion 352 is coupled to the first end portion 351*a* of the center portion 351, and a first end portion 353*a* of the second perimeter portion 353 is coupled to the first end portion 351*a* of the center portion 351. A second end portion 352*b* of the first perimeter portion 352 and a second end portion 353*b* of the second perimeter portion 353 are spaced apart from each other to form the slit 'S', and a second end portion 351*b* of the center portion 351 is disposed (or located) adjacent to the slit 'S'. That is, the second end portion 352*b* of the first perimeter portion 352, the second end portion 353*b* of the second perimeter portion 353, and the second end portion 351*b* of the center portion 351 are spaced apart from one another so as to be disposed (or located) adjacent to one another.

The second end portion 352*b* of the first perimeter portion 352 and the second end portion 353*b* of the second perimeter portion 353 may be formed to have different curvatures. For example, the second end portion 353*b* of the second perimeter portion 353 may be bent more inward than the second end portion 352*b* of the first perimeter portion 352. A diameter $r_{co}$ of an outer surface of the first perimeter portion 352 may be substantially the same as a diameter Rei of an inner surface of the electrode assembly 120, and the outer surface of the first perimeter portion 352 may entirely contact the inner surface of the electrode assembly 120. Because the second end portion 353*b* of the second perimeter portion 353 is bent more inward than the second end portion 352*b* of the first perimeter portion 352, a portion of an outer surface of the second perimeter portion 353, that is, the second end portion 353*b* of the second perimeter portion 353*b*, does not contact the inner surface of the electrode assembly 120. That is, the second end portion 353*b* of the second perimeter portion 353 may be slightly separated (or spaced) from the inner surface of the electrode assembly 120.

In order for the center portion 351 not to damage an inner circumferential surface of the electrode assembly 120 when the center pin 350 is inserted into the cavity 'h' formed in the center of the electrode assembly 120, a length of the center portion 351 may have a value satisfying Condition 1. $r_{co}$ in Condition 1 corresponds to the diameter $r_{co}$ of the outer surface of the first perimeter portion 352.

Also, when an external force or an external impact strong enough to deform the center pin 350 is applied to the rechargeable battery, a length of the center portion 351 may have a value satisfying Condition 2 and/or Condition 3 in order for the center portion 351 of the center pin 350 to induce an internal short as described above. $r_{ei}$ in Conditions 2 and 3 corresponds to an inner diameter of the first perimeter portion 352.

Table 1 below shows combustion test results of a rechargeable battery including a center pin according to the present embodiment and a rechargeable battery including a center pin according to a comparative example. Table 2 shows collision test results of a rechargeable battery including the center pin according to the present embodiment and a rechargeable battery including a center pin according to the comparative example.

The center pin according to the comparative example has a substantially cylindrical shape in which a top surface and a bottom surface are open and a side surface is a closed curved surface. At the center pin according to the present embodiment, a top surface and a bottom surface are open, a slit is formed in a side surface, a center portion extends toward the slit, and a length of the center portion satisfies Conditions 1 through 3.

In Tables 1 and 2, Ln (n=0, 1, 2, 3, 4, 5) is an index indicating a state of each rechargeable battery. L0 indicates a state where an abnormal state of the rechargeable battery is not detected, L1 indicates a state where an outer temperature of the rechargeable battery is less than 150° and an electrolytic solution begins to leak out, L2 indicates a state where an outer temperature of the rechargeable battery is less than 200°, L3 indicates a state where an outer temperature of the rechargeable battery is equal to or greater than 200° and that smoke begins to be emitted, L4 indicates a state where a flame begins to be generated, and L5 indicates a state where an explosion occurs.

|  | No. | Combustion test result | Determination |
|---|---|---|---|
| Comparative example | 1 | L5 | NG |
|  | 2 | L4 | OK |
|  | 3 | L5 | NG |
|  | 4 | L5 | NG |
|  | 5 | L5 | NG |
|  | 6 | L4 | OK |
|  | 7 | L5 | NG |
|  | 8 | L4 | OK |
| Present embodiment | 1 | L4 | OK |
|  | 2 | L4 | OK |
|  | 3 | L4 | OK |
|  | 4 | L4 | OK |
|  | 5 | L4 | OK |
|  | 6 | L4 | OK |
|  | 7 | L4 | OK |
|  | 8 | L4 | OK |

In the combustion test, when a result is L4, a corresponding state is relatively stable and satisfies an Underwriters Laboratories (UL) standard. Referring to Table 1, all of the test results of the rechargeable battery including the center pin according to the present embodiment satisfy the UL standard whereas some of test results of the rechargeable battery including the center pin according to the comparative example do not satisfy the UL standard.

The rechargeable battery including the center pin according to the comparative example exhibits the above test results because the side surface of the rechargeable battery is a closed curved surface with no slit, whereas the rechargeable battery including the center pin according to the present embodiment exhibits the above test results because an inner gas generated during combustion may flow through the slit formed at the side surface of the center pin.

TABLE 2

|  | No. | Collision test result | Determination |
|---|---|---|---|
| Comparative example | 1 | L0 | OK |
|  | 2 | L4 | NG |
|  | 3 | L0 | OK |
|  | 4 | L0 | OK |

TABLE 2-continued

|  | No. | Collision test result | Determination |
|---|---|---|---|
|  | 5 | L4 | NG |
|  | 6 | L4 | NG |
|  | 7 | L0 | OK |
|  | 8 | L0 | OK |
| Present embodiment | 1 | L0 | OK |
|  | 2 | L0 | OK |
|  | 3 | L0 | OK |
|  | 4 | L0 | OK |
|  | 5 | L0 | OK |
|  | 6 | L0 | OK |
|  | 7 | L0 | OK |
|  | 8 | L0 | OK |

In the collision test, when a result is equal to or less than L1, a corresponding state is relatively stable and satisfies the UL standard. In Table 2, the collision test was performed eight times by changing a direction of an external force. Referring to Table 2, all of the test results of the rechargeable battery including the center pin according to the present embodiment satisfy the UL standard, whereas some of test results of the rechargeable battery including the center pin according to the comparative example do not satisfy the UL standard when the direction of the external force is changed.

In the rechargeable battery including the center pin according to the present embodiment, at least one of an end portion of the center portion and end portions of first and second perimeter portions, which are disposed (or located) adjacent to one another about the slit, induces an internal short by passing through (or penetrating) an electrode assembly before the rechargeable battery explodes. As such, because possibilities of a leakage of electrolytic solution, of an outer temperature of the rechargeable battery increasing, and of a fire breaking out are reduced (or the leakage, the increasing of temperature, and the fire breaking out are prevented), a possibility of an accident of the rechargeable battery may be reduced (or an accident may be avoided), as shown in Table 2.

By contrast, because the rechargeable battery including the center pin according to the comparative example has no structure for passing through (or puncturing) the electrode assembly, an accident such as a flame due to an external impact may occur, as shown in Table 2.

While the present invention has been particularly shown and described with reference to exemplary embodiments thereof using specific terms, the embodiments and terms have been used to explain the present invention and should not be construed as limiting the scope of the present invention as defined by the claims. Accordingly, it will be understood by those of ordinary skill in the art that various changes in form and details may be made therein without departing from the spirit and scope of the present invention as defined by the following claims, and equivalents thereof.

What is claimed is:

1. A rechargeable battery comprising:
an electrode assembly formed by winding a positive electrode plate, a negative electrode plate, and a separator between the positive electrode plate and the negative electrode plate, and defining a cavity extending along an axial direction of the electrode assembly;
a single metal plate shaped to comprise a center pin extending along the axial direction and housed in the cavity;
a can having an opening in which the electrode assembly and the center pin are received; and
a cap assembly configured to close the opening,
wherein the center pin comprises:
a center portion extending along a radial direction of the center pin, and comprising a second end portion whereat the single metal plate is folded in half along the axial direction;
a first perimeter portion bent at a first side of a first end portion of the center portion, the first end portion being opposite to the second end portion, and the first perimeter portion being curved to extend in a first circumferential direction from the first end portion toward the second end portion of the center portion; and
a second perimeter portion bent at a second side of the first end portion of the center portion, and curved to extend from the first end portion toward the second end portion in a second circumferential direction that is opposite to the first circumferential direction of the first perimeter portion.

2. The rechargeable battery of claim 1, wherein a first end of the metal plate as an end portion of the first perimeter portion, and a second end of the metal plate as an end portion of the second perimeter portion, are spaced from each other to define a slit adjacent the second end portion of the center portion.

3. The rechargeable battery of claim 2, wherein the slit extends along the axial direction.

4. The rechargeable battery of claim 1, wherein an end portion of the first perimeter portion, an end portion of the second perimeter portion, and the second end portion of the center portion are spaced from one another and adjacent one another.

5. The rechargeable battery of claim 1, wherein the axial direction and the radial direction are orthogonal to each other.

6. The rechargeable battery of claim 1, wherein the center portion linearly extends to pass through a center of the cavity.

7. The rechargeable battery of claim 1, wherein a top surface and a bottom surface of the center pin are open.

8. The rechargeable battery of claim 1, wherein a length of the center portion in the radial direction is less than a diameter of an outer circumferential surface of the center pin.

9. The rechargeable battery of claim 8, wherein the length of the center portion in the radial direction is greater than ½ of the diameter of the outer circumferential surface of the center pin.

10. The rechargeable battery of claim 8, wherein when the diameter of the outer circumferential surface of the center pin is $r_{co}$ and a diameter of an inner circumferential surface of the center pin is $r_{ci}$, the length $l_1$ of the center portion in the radial direction satisfies $$\frac{(r_{co} + r_{ci})}{2} < l_1.$$

11. The rechargeable battery of claim 1, wherein a thickness of the center portion is greater than a thickness of each of the first perimeter portion and the second perimeter portion.

12. The rechargeable battery of claim 1, wherein an end portion of the first perimeter portion extends in the first circumferential direction of the center pin from the first end portion of the center portion, and
an end portion of the second perimeter portion extends in the second circumferential direction of the center pin from the first end portion of the center portion.

13. The rechargeable battery of claim 12, wherein the end portion of the first perimeter portion is bent more inward than the end portion of the second perimeter portion.

14. The rechargeable battery of claim 1, wherein an outer circumferential surface of the center pin contacts an inner surface of the electrode assembly.

15. The rechargeable battery of claim 1, wherein the center pin comprises a conductive material.

16. A rechargeable battery comprising:
  an electrode assembly formed by winding a positive electrode plate, a negative electrode plate, and a separator between the positive electrode plate and the negative electrode plate, and defining a cavity extending along an axial direction of the electrode assembly;
  a single metal plate shaped to comprise a center pin extending along the axial direction and housed in the cavity;
  a can having an opening in which the electrode assembly and the center pin are received; and
  a cap assembly configured to close the opening,
  wherein the center pin comprises:
    a center portion extending along a radial direction of the center pin through a center of the center pin, and comprising a second end portion whereat the single metal plate is folded in half along the axial direction;
    a first perimeter portion bent at a first side of a first end portion of the center portion, the first end portion being opposite to the second end portion, and the first perimeter portion being curved to extend in a first circumferential direction of the center pin from the first end portion toward the second end portion; and
    a second perimeter portion bent at a second side of the first end portion of the center portion, and curved to extend from the first end portion toward the second end portion in a second circumferential direction that is opposite to the first circumferential direction of the center pin,
  wherein the second end portion of the center portion, an end portion of the first perimeter portion adjacent the second end portion, and an end portion of the second perimeter portion adjacent the second end portion, are all adjacent one another.

17. The rechargeable battery of claim 16, wherein the second end portion of the center portion, the end portion of the first perimeter portion, and the end portion of the second perimeter portion are spaced from one another.

18. The rechargeable battery of claim 16, wherein the center pin defines a slit extending along the axial direction,
  wherein the second end portion of the center portion, the end portion of the first perimeter portion, and the end portion of the second perimeter portion are adjacent the slit such that at least one of the second end portion of the center portion, the end portion of the first perimeter portion, and the end portion of the second perimeter portion is configured to extend beyond the slit and penetrate the electrode assembly due to an external impact.

19. The rechargeable battery of claim 16, wherein a length of the center portion in the radial direction is less than a diameter of an outer circumferential surface of the center pin.

20. The rechargeable battery of claim 16, wherein a length $l_1$ of the center portion in the radial direction satisfies $$\frac{(r_{co} + r_{ci})}{2} < l_1 < r_{co}$$

where $r_{co}$ is a diameter of an outer circumferential surface of the center pin and $r_{ci}$ is a diameter of an inner circumferential surface of the center pin.

* * * * *